(12) United States Patent
Tang

(10) Patent No.: US 8,068,334 B2
(45) Date of Patent: Nov. 29, 2011

(54) ELECTRONIC DEVICE

(75) Inventor: Zi-Ming Tang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 171 days.

(21) Appl. No.: 12/502,403

(22) Filed: Jul. 14, 2009

(65) Prior Publication Data
US 2010/0142131 A1 Jun. 10, 2010

(51) Int. Cl.
*G06F 1/16* (2006.01)

(52) U.S. Cl. ......... 361/679.27; 361/679.26; 361/679.58; 379/433.13; 16/345; 16/352; 16/362

(58) Field of Classification Search ............. 361/679.09, 361/679.27; 16/345, 352, 362–364
See application file for complete search history.

(56) References Cited

U.S. PATENT DOCUMENTS

| | | | | | |
|---|---|---|---|---|---|
| 4,730,364 | A | * | 3/1988 | Tat-Kee | 361/679.09 |
| 4,996,522 | A | * | 2/1991 | Sunano | 361/679.09 |
| 5,016,849 | A | * | 5/1991 | Wu | 248/176.3 |
| 5,168,426 | A | * | 12/1992 | Hoving et al. | 361/679.09 |
| 5,205,017 | A | * | 4/1993 | Wang | 16/367 |
| 5,927,997 | A | * | 7/1999 | Ruland et al. | 439/31 |
| 6,008,983 | A | * | 12/1999 | Yen | 361/679.11 |
| 6,076,786 | A | * | 6/2000 | Meyer | 248/161 |
| 6,532,149 | B2 | * | 3/2003 | Dhar et al. | 361/679.09 |
| 6,788,527 | B2 | * | 9/2004 | Doczy et al. | 361/679.11 |
| 6,796,542 | B2 | * | 9/2004 | Tsai | 248/291.1 |
| 6,873,521 | B2 | * | 3/2005 | Landry et al. | 361/679.06 |
| 6,977,810 | B2 | * | 12/2005 | Song | 361/679.06 |
| 7,006,853 | B2 | * | 2/2006 | Kang et al. | 455/575.3 |
| 7,515,405 | B2 | * | 4/2009 | Lev et al. | 361/679.55 |
| 7,566,033 | B2 | * | 7/2009 | Schwager et al. | 248/125.9 |
| 7,617,568 | B2 | * | 11/2009 | Jing | 16/286 |
| 7,652,877 | B2 | * | 1/2010 | Nishizawa | 361/679.27 |
| 7,836,554 | B2 | * | 11/2010 | Fu | 16/362 |
| 7,903,400 | B1 | * | 3/2011 | Chen et al. | 361/679.27 |
| 2001/0030850 | A1 | * | 10/2001 | Ditzik | 361/683 |
| 2003/0040288 | A1 | * | 2/2003 | Kang et al. | 455/90 |
| 2003/0112589 | A1 | * | 6/2003 | Shimano et al. | 361/683 |
| 2005/0052833 | A1 | * | 3/2005 | Tanaka et al. | 361/681 |
| 2005/0206615 | A1 | * | 9/2005 | Tanimoto et al. | 345/156 |
| 2008/0161075 | A1 | * | 7/2008 | Kim et al. | 455/575.4 |
| 2008/0297995 | A1 | * | 12/2008 | Lai | 361/680 |

* cited by examiner

*Primary Examiner* — Jinhee Lee
*Assistant Examiner* — Anthony Q Edwards
(74) *Attorney, Agent, or Firm* — Altis Law Group, Inc.

(57) ABSTRACT

An electronic device includes a first body, a second body, two hinge assemblies, two resilient members, and two latching members. The hinge assemblies hinge the first body on the second body. The resilient members are received in the second body and connect with the second body elastically. Opposite ends of the resilient member resist the second body and the hinge assembly, so that the hinge assembly and the first body move relative to the second body.

14 Claims, 5 Drawing Sheets

ELECTRONIC DEVICE

BACKGROUND

1. Technical Field

The present disclosure generally relates to electronic devices, and particularly, to a portable electronic device.

2. Description of Related Art

Collapsible electronic devices, such as notebook computers, are popular for their portability. In the collapsible electronic device, a cover is hinged to a main body via a typical hinge assembly.

The typical hinge assembly often allows the cover to only rotate relative to the main body, but not move relative thereto. An interstice at the joint of the cover and the main body facilitates hinging the cover, so an interstice remains between the cover and the main body when the cover is latched to the main body. The cover may move relative to the main body even when the cover is latched, presenting an unsteady disposition.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
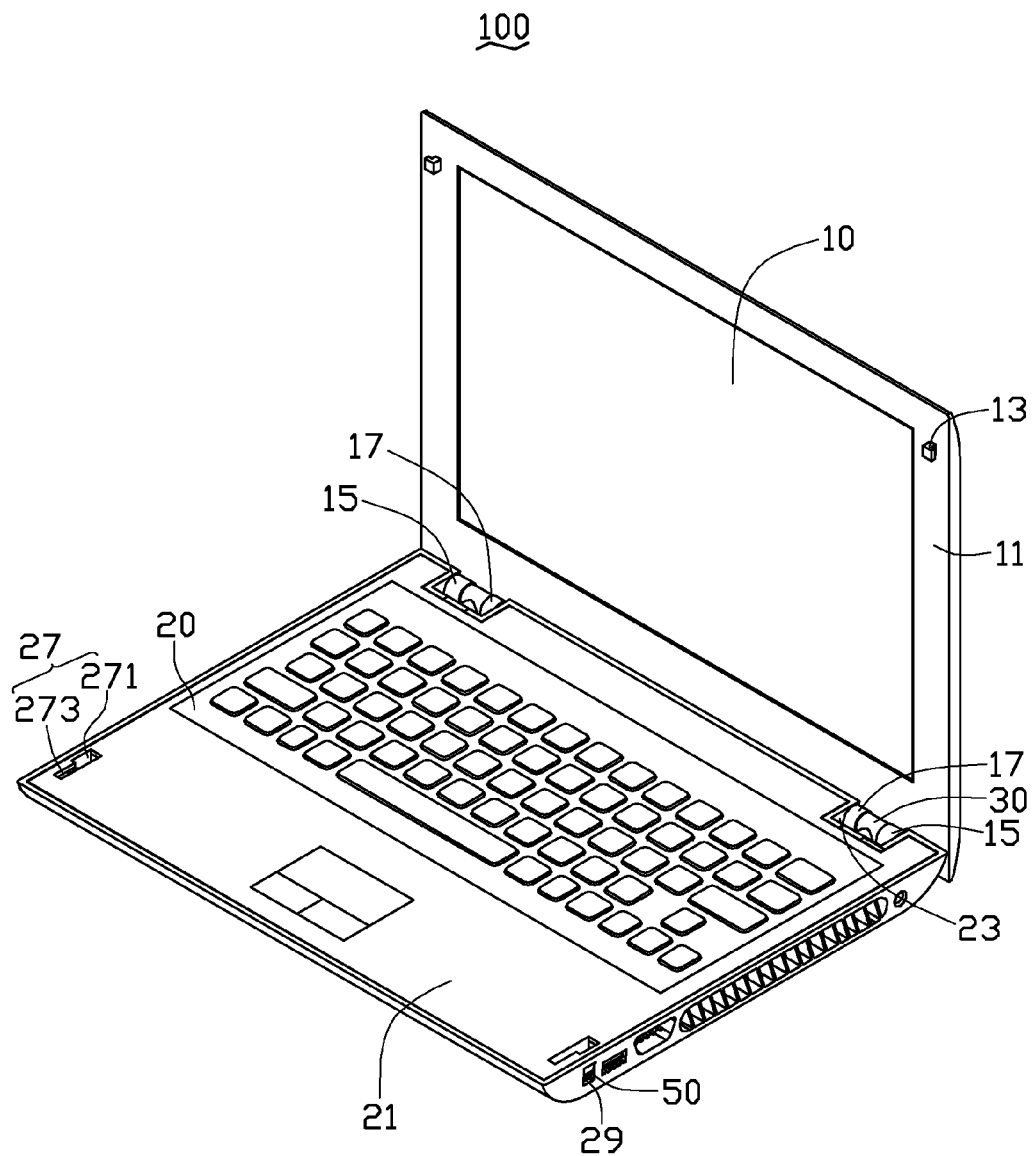
FIG. 1 is an assembled, isometric view of an embodiment of an electronic device including a first body and a second body.

The present electronic device may be a mobile phone, notebook, or other foldable device. Referring to FIG. 1, an embodiment of the portable electronic device is described and illustrated as a notebook 100.

Figure 2:
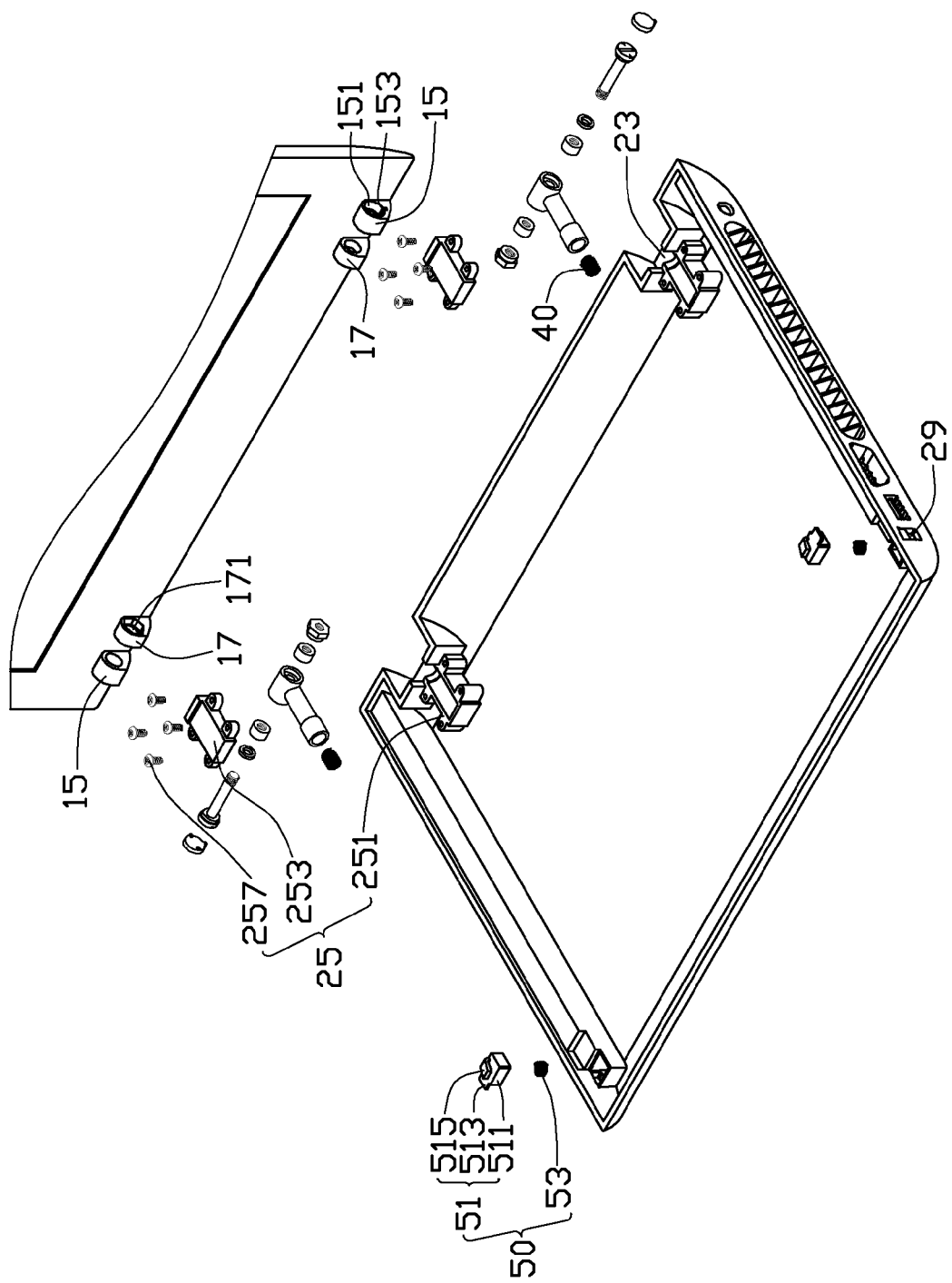
FIG. 2 is an exploded, isometric view of part of the electronic device of FIG. 1

Referring to FIG. 1 and FIG. 2, the notebook 100 includes a first body 10, a second body 20, two hinge assemblies 30, two resilient members 40, and two latching members 50. The hinge assemblies 30 hinge the first body 10 on the second body 20. The resilient members 40 are received in the second body 20.

The first body 10 includes a first surface 11. Two hooks 13, two first connecting portions 15, and two second connecting portions 17 are formed on the first surface 11. The hooks 13 are opposite to each other. The first connecting portions 15 are opposite to each other. Each first connecting portion 15 defines a first connecting hole 151 and a positioning slot 153 communicating with the first connecting hole 151. Each second connecting portion 17 defines a second connecting hole 171.

The second body 20 includes a second surface 21, two mounting slots 23, two receiving chambers 25, two locking slots 27, and two receiving slots 29. Each mounting slot 23 communicates with a receiving chamber 25. Each locking slot 27 communicates with a receiving slot 29. Each receiving chamber 25 includes a main body 251 and a cover 253. Each receiving chamber 25 defines a guiding slot 255 (shown in FIG. 5) defined by the main body 251 and the cover 253. The guiding slot 255 communicates with the mounting slot 23. The main body 251 is connected to the cover 253 by a plurality of fasteners 257. The locking slot 27 includes an entrance 271 and a locking portion 273. The entrance 271 and the locking portion 273 communicate with the second surface 21. The receiving slot 29 is defined under the locking slot 27 and extends through a sidewall of the second body 20.

Figure 3:
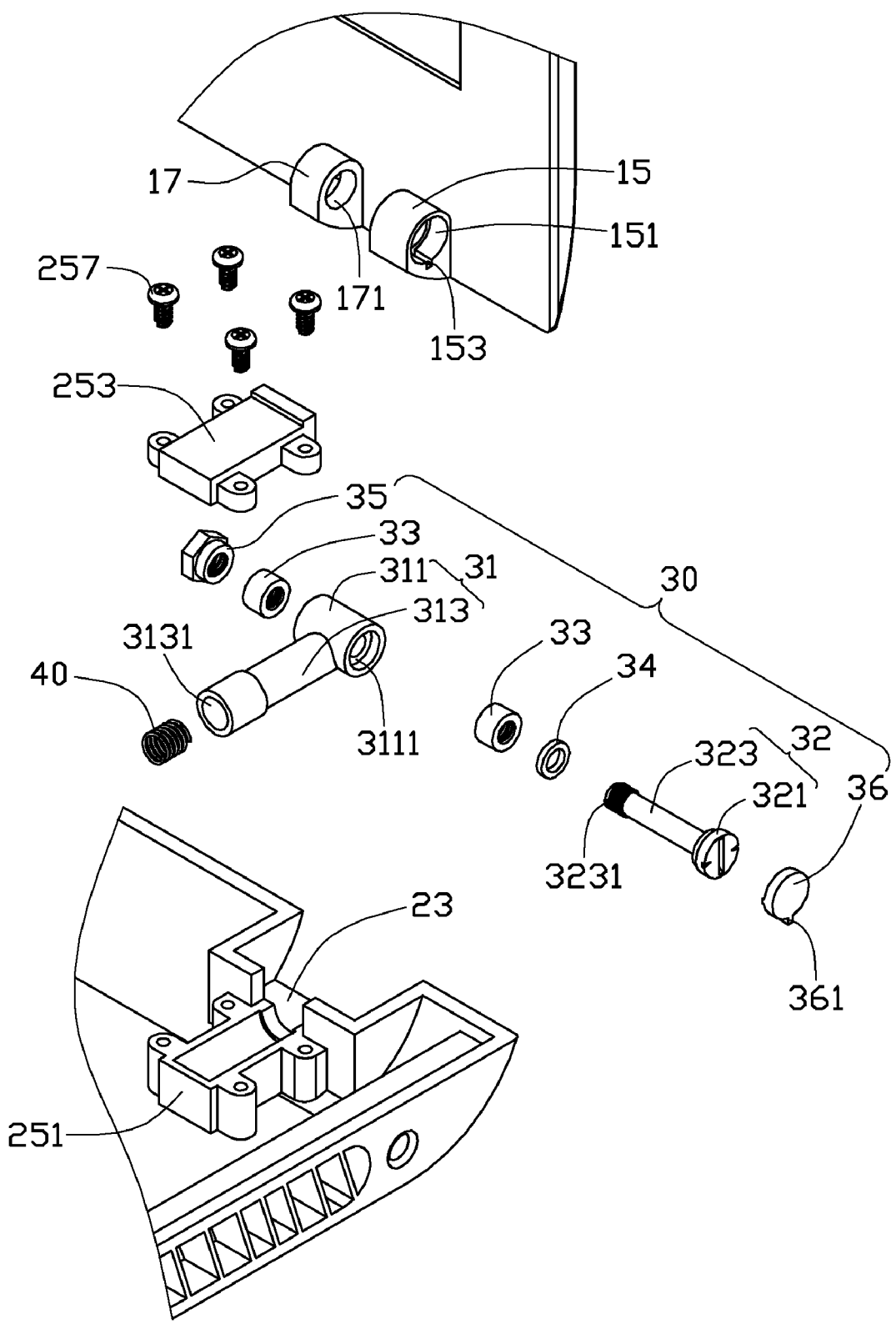
FIG. 3 is another exploded, isometric view of part of the electronic device of FIG. 1.

Referring to FIG. 3, each hinge assembly 30 includes a sleeve 31, a shaft 32 extending through the sleeve 31, at least one friction member 33, a spacer 34, a fastener 35, and a locking member 36. The sleeve 31 includes a receiving portion 311 and a guiding portion 313 extending substantially perpendicularly from the surface of the receiving portion 311. The receiving portion 311 defines a mounting hole 3111 extending through the receiving portion 311, and the guiding portion 313 defines a guiding hole 3131. The axis of the mounting hole 3111 is substantially perpendicular to the axis of the guiding hole 3131. The shaft 32 includes a head 321 and a column 323. The column 323 includes a threaded portion 3231 at an end away from the head 321. In the illustrated embodiment, two friction members 33 sleeve on the column 323 and are received in the mounting hole 3111 of the sleeve 31. The spacer 34 sleeves on the column 323 and resists the head 321. The fastener 35 engages with the threaded portion 3231 to fix the members of the hinge assembly 30 on the shaft 32. The locking member 36 engages with the head 321 of the shaft 32, and includes a positioning protrusion 361 engaging with the positioning slot 153.

Referring to FIG. 2 and FIG. 3, each resilient member 40 is received in the guiding hole 3131 of a corresponding sleeve 31. Opposite ends of the resilient member 40 resist the guiding slot 255 and a sidewall of the guiding hole 3131 of the sleeve 31 correspondingly. In the illustrated embodiment, the resilient member 40 is a helical compression spring.

Figure 4:
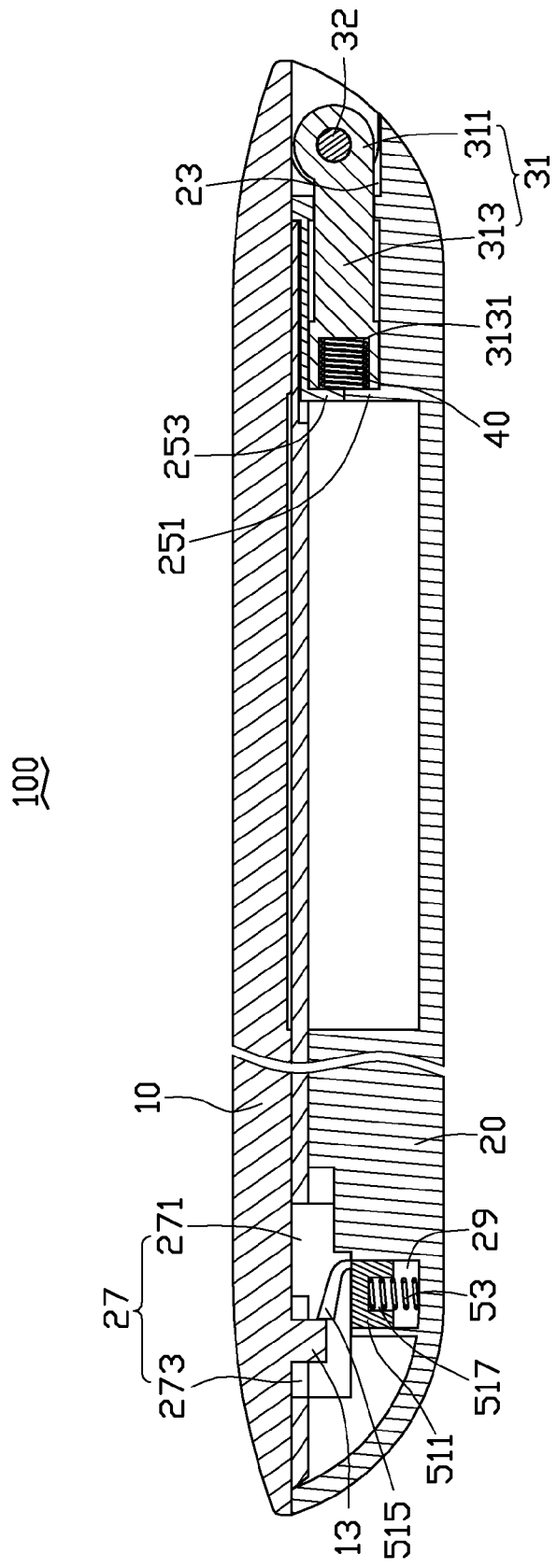
FIG. 4 is a cross-section of the electronic device of FIG. 1, showing the electronic device in a latched state.

Referring to FIG. 2 and FIG. 4, each latching member 50 is received in one receiving slot 29. The latching member 50 includes a latching portion 51 and a resilient portion 53. The latching portion 51 includes a main body 511, a switch 513 extending from the main body 511, a resisting hook 515 extending from the main body 511, and a receiving hole 517. Part of the resilient portion 53 is received in the receiving hole 517 of the main body 511. Opposite ends of the resilient portion 53 resist a sidewall of the receiving hole 517 of the latching portion 51 and a sidewall of the receiving slot 29 correspondingly. In the illustrated embodiment, the resilient portion 53 is a helical compression spring.

Referring to FIG. 2 and FIG. 3, when the hinge assemblies 30 are applied in the notebook 100, each receiving portion 311 of the sleeve 31 is positioned between a first connecting portion 15 and a corresponding second connecting portion 17. The column 323 of the shaft 32 extends through the first connecting hole 151 of the first connecting portion 15, the spacer 34, the friction member 33, the mounting hole 3111 of the sleeve 31, and the second connecting hole 171 of the second connecting portion 17. The spacer 34 and the friction member 33 are received in the mounting hole 3111 of the sleeve 31. The fastener 35 engages with the threaded portion 3231 of the column 323 to fixedly sleeve these members on the column 323. The positioning protrusion 361 of the locking member 36 engages with the position slot 153 of the first connecting portion 15, to restrict the shaft 32 from hinging on the first body 10. A first connecting portion 15, a second connecting portion 17 and the receiving portion 311 of one of the sleeves 31 are positioned in a mounting slot 23. The guiding portion 313 of the sleeve 31 extends into the guiding slot 255, and one of the resilient members 40 resists one of the guiding slots 255. When the first connecting portions 15 and the second connecting portions 17 are located outside of the second body 20, the resilient members 40 are not engaged.

Figure 5:
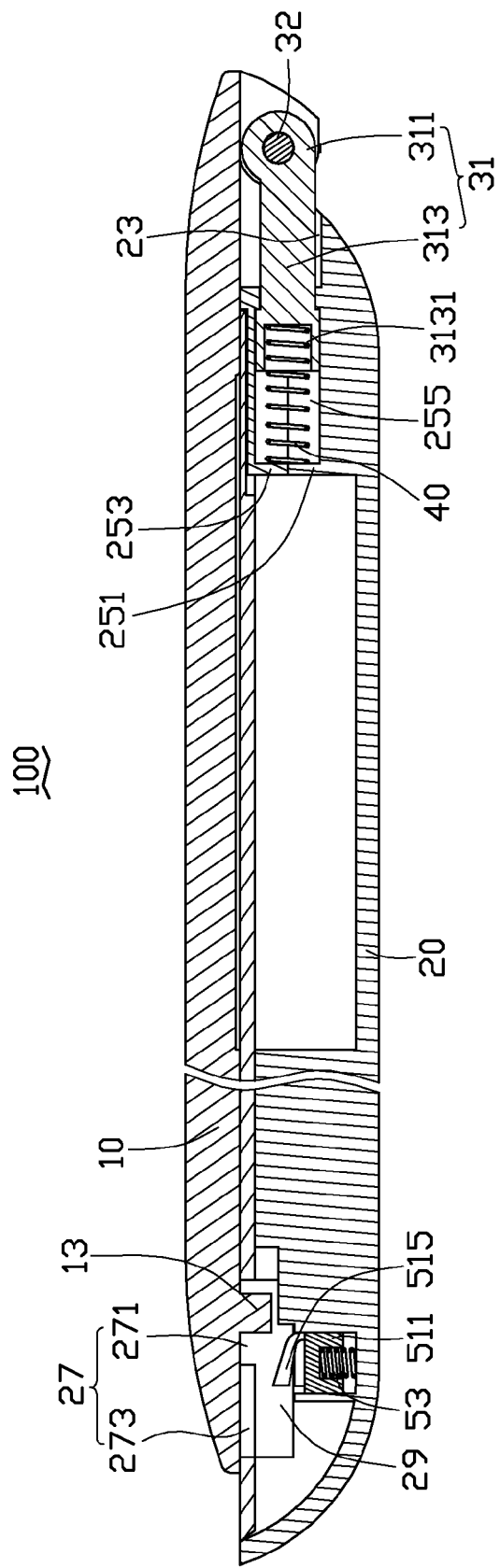
FIG. 5 is a cross-section of the electronic device of FIG. 1, showing the first body moving a distance away from the second body.

Referring to FIG. 1, FIG. 4, and FIG. 5, when latching the first body 10 and the second body 20, the hooks 13 are received in the receiving slots 29 through the entrances 271 of the locking slots 27. In use, the first body 10 is slid, such that the resilient members 40 are compressed and the hooks 13 move towards the locking portions 273 of the locking slots 27. When moving, the hooks 13 compress the resisting hooks 515 of the latching portions 51, which in turn compress the resilient portions 53 and drop towards the base wall of the receiving slots 29. When the hooks 13 pass the resisting hooks 515, elastic force created by the resilient portions 53 forces the latching portions 51 away from the base wall of the receiving slots 29, so that the hooks 13 are latched in the locking portions 273 of the locking slots 27 by the resisting hooks 515. Therefore, the first body 10 and the second body 20 are latched together.

The first body 10 is unlatched from the second body 20 by pressing the switches 513 (shown in FIG. 2), and the latching portions 51 compress the resilient portions 53 until the hooks 13 are disengaged from the resisting hooks 515. An elastic force created by the resilient members 40 forces the hooks 13 to the entrances 271 from the locking portions 273. When an external force is applied on the first body 10, the hooks 13 withdraw from the entrances 271 of the locking slots 27. Accordingly, the first body 10 and the second body 20 are unlatched.

The resilient members 40 can move the first body 10 a distance with the hinge assemblies 30 during latching or unlatching of first body 10 and second body 20, such that the first body 10 can rotate relative to the second body 20. Therefore, no interstice between the first body 10 and the second body 20 is needed, to securely latch the first body 10 and the second body 20.

In another embodiment, the notebook 100 may include one hinge assembly 30 and one resilient member 40. The first body 10 may define one first connecting portion 15 and one second connecting portion 17, and the second body 20 may define one mounting slot 23 and one receiving chamber 25 correspondingly.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. An electronic device, comprising:
   a first body comprising a first connecting portion and a second connecting portion;
   a second body connecting to the first body;
   a hinge assembly hinging the first body on the second body, the hinge assembly comprising a sleeve connected to the first body, wherein the sleeve comprises a receiving portion, and the second body defines a mounting slot receiving the receiving portion, the first connecting portion and the second connecting portion received in the mounting slot; and the receiving portion of the sleeve being positioned between the first connecting portion and the second connecting portion; and
   a resilient member received in the second body, sliding the hinge assembly and the first body a predetermined distance relative to the second body.

2. The electronic device of claim 1, wherein the sleeve further comprises a guiding portion extending from the receiving portion; the second body forms a receiving chamber communicating with the mounting slot; and the guiding portion is received in the receiving chamber.

3. The electronic device of claim 2, wherein the guiding portion defines a guiding hole in which the resilient member is received and resists the receiving chamber of the second body.

4. The electronic device of claim 1, wherein the hinge assembly further comprises a shaft extending through the first connecting portion, the receiving portion of the sleeve, and the second connecting portion.

5. The electronic device of claim 4, wherein the first body further defines a positioning slot; and the hinge assembly further comprises a fastener forming a positioning protrusion engaging in the positioning slot.

6. The electronic device of claim 5, wherein the hinge assembly further comprises a friction member sleeved in the shaft and received in the receiving portion of the sleeve.

7. The electronic device of claim 1, wherein the first body comprises a first surface and a hook formed on the first surface and engaged by a latching member.

8. The electronic device of claim 7, wherein the second body comprises a locking slot comprising an entrance and a locking portion into which the hook enters through the entrance to be locked by the locking portion.

9. The electronic device of claim 8, wherein the second body defines a receiving slot communicating with the locking slot; and the latching member comprises a latching portion and a resilient portion resisting the latching portion.

10. The electronic device of claim 9, wherein the latching member further comprises a resisting hook engaging with the hook of the first body.

11. The electronic device of claim 1, wherein the resilient member is a helical compression spring.

12. An electronic device, comprising:
   a first body comprising a first connecting portion and a second connecting portion;
   a second body connecting to the first body;
   a hinge assembly hinging the first body on the second body, the hinge assembly comprising a sleeve connected to the first body, wherein the sleeve comprises a receiving portion, and the second body defines a mounting slot receiving the receiving portion, the first connecting portion and the second connecting portion received in the mounting slot; and the receiving portion of the sleeve being positioned between the first connecting portion and the second connecting portion; and
   a resilient member elastically positioned between the first body and the second body, sliding the first body relative to the second body.

13. The electronic device of claim 12, wherein the hinge assembly further comprises a shaft extending through the first connecting portion, the receiving portion of the sleeve, and the second connecting portion.

14. The electronic device of claim 13, wherein the first body further defines a positioning slot; and the hinge assembly further comprises a fastener, the fastener forming a positioning protrusion engaging in the positioning slot.

* * * * *